Patented Apr. 13, 1937

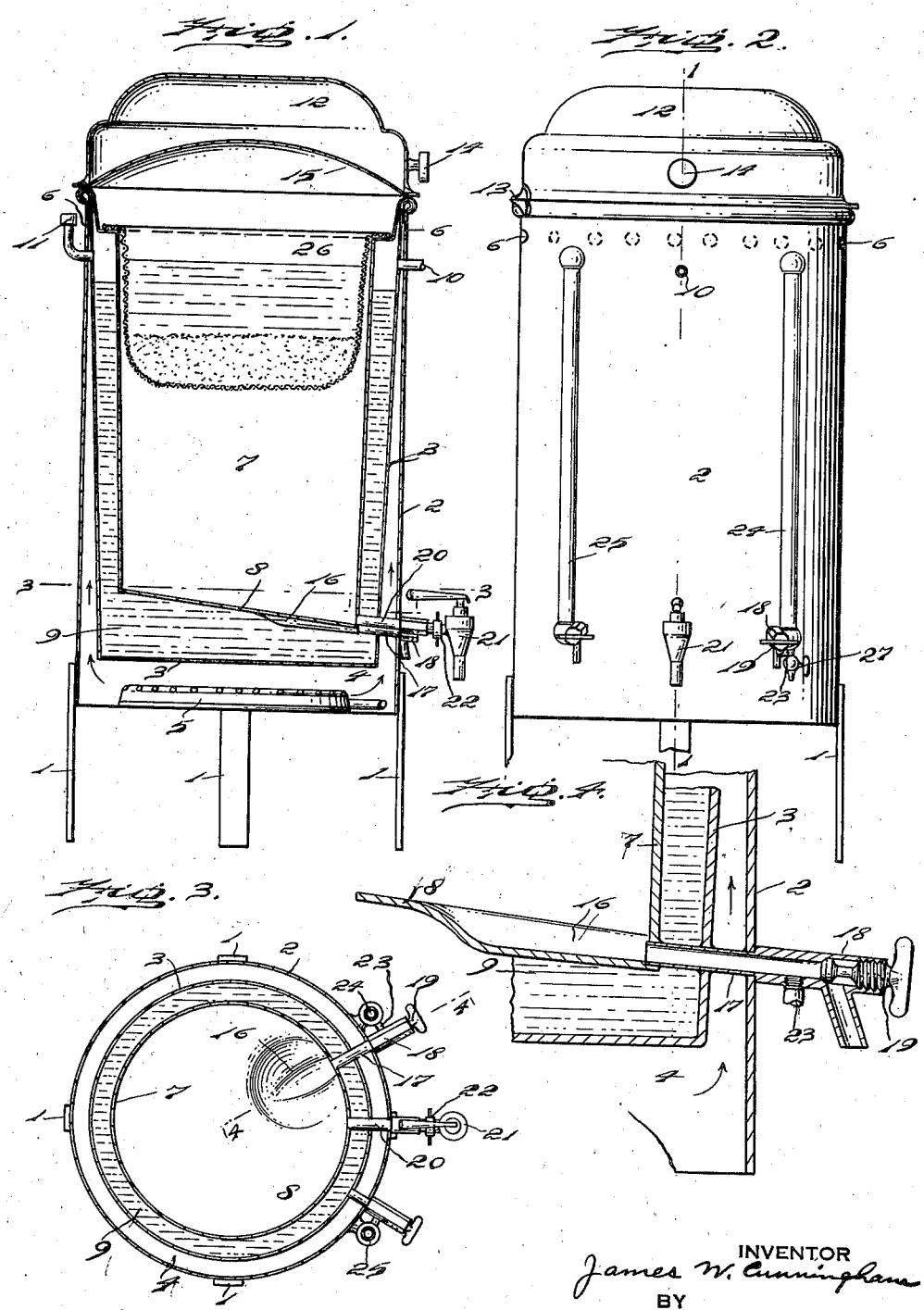

2,076,881

UNITED STATES PATENT OFFICE 2,076,881

COFFEE URN

James W. Cunningham, Haddon Heights, N. J., assignor to Horn and Hardart Baking Co., Philadelphia, Pa., a corporation of New Jersey Application April 20, 1936, Serial No. 75,368

2 Claims. (Cl. 53—3)

In the dispensing of coffee in hotels and restaurants, it is necessary to maintain the coffee urns in a clean and sterilized condition. Strainers and filters are usually employed to prevent the coffee grounds passing to the coffee, but, even with this precaution, fine particles of the ground coffee pass into the liquid. If coffee grounds or sediment come into contact with the walls of the coffee urn, a cement like deposit forms on the walls of the urn and the discharge outlet which is difficult to remove. If fresh coffee comes into contact with stale coffee or deposited coffee grounds, the fine bouquet and flavor of the coffee dispensed is greatly impaired.

In order to overcome these defects in coffee urns, it has heretofore been proposed to provide a sump in the bottom of the coffee urn, but this did not solve the problem, because the draw off outlet led directly from the sump and coffee was deposited on the walls of the outlet. Since the valve was connected with the sump by a pipe and pipe fittings which provided an irregular inner wall contour, the outlet could not be properly cleaned with a wire brush.

My present invention is designed to overcome the defects of prior coffee urns, and a primary object of the invention is to devise a coffee urn which can be readily maintained in a clean and sanitary condition.

With the above and other objects in view as will more clearly hereinafter appear, my invention comprehends a novel coffee urn.

It further comprehends a novel coffee urn, wherein the discharge outlet for the coffee to be dispensed is located above a sump, and the sump is provided with an independent drainage outlet, the outlets being constructed in such a manner that a wire brush can be passed there-through to thoroughly clean their inner walls.

Other novel features of construction and advantage will hereinafter more clearly appear in the detailed description and the appended claims.

For the purpose of illustrating the invention, I have shown in the accompanying drawing, a typical embodiment of it, which, in practice, will give satisfactory and reliable results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a sectional elevation of the coffee urn, the section being taken on line 1—1 of Figure 2.

Figure 2 is a front elevation of a coffee urn, embodying my invention.

Figure 3 is a section on line 3—3 of Figure 1.

Figure 4 is an enlarged section taken on line 4—4 of Figure 3.

Similar numerals indicate corresponding parts.

Referring to the drawing:—

The coffee urn is provided with a double walled metal casing mounted on legs 1. The casing consists of an outer metal shell 2 and an inner casing 3 which latter has its side walls converging downwardly to form a chamber 4 to receive products of combustion from a burner 5, and exit openings 6 to the atmosphere are provided near the upper end of the chamber 4. 7 is the coffee container which is spaced from the side walls of the inner casing 3 and its inclined bottom 8 is spaced from the bottom of the casing 3, thereby forming a chamber 9 for hot water. The coffee container at its upper end is deflected laterally and upwardly to overhang the double walled casing and is connected thereto in any desired or conventional manner. The hot water chamber 9 has a hot water inlet 10 and at its upper end is provided with a vent 11 to the atmosphere.

A cover 12 of novel construction is hinged at 13 to the casing and is provided with a grasping knob 14. The cover is dome shaped and has a baffle 15 closing its bottom and spaced from its top to serve as a condensing baffle.

The inclined bottom 8, at its lowest end, is provided with a sump 16 communicating with a drainage outlet 17, in the form of a straight pipe having a drainage valve or cock 18, provided with a removable plug 19, so that upon removal of the plug a wire brush or other cleaning implement can be passed through the drainage outlet and directly into the sump.

The outlet 20 for dispensing coffee is in the form of a straight pipe having its inlet opening into the coffee container above the sump, and a dispensing valve 21 is connected with the pipe by a quick detachable coupling 22, so that, upon removal of the valve 21, a cleaning implement such as for example a wire brush can be passed through the outlet 20. A bypass 23 connects the drainage outlet with a gauge glass 24 for the coffee, and a gauge glass 25 communicates with the hot water chamber.

26 is a bag for receiving the coffee and coffee grounds and is usually made of canton flannel. This bag 26 is supported on the laterally extending portion at the upper end of the coffee container.

The prepared coffee including the coffee grounds are poured into the bag 26 and the coffee liquid passes to the lower end of the coffee container where it is maintained in a heated condition by the hot water in the hot water chamber.

The inlet to the dispensing outlet is above the sump, so that, after all the coffee possible has passed through the dispensing valve, there still remains a small amount of coffee, usually a fraction of a cup, in the sump, any grounds, sediment, dust or foreign material that may have seeped through the bag or filter into the coffee liquid are carried down the inclined bottom to the sump.

In order to clean the dispensing outlet, the dispensing valve is detached by actuating the quick removable coupling and a wire brush is passed back and forth through the straight pipe of the dispensing outlet to remove any deposits on its walls.

The drainage cock is opened and its valve removed, so that a wire brush can be passed back and forth through the drainage outlet to remove any deposits on its walls, and in the sump. The coffee container is cleaned in the usual manner.

When newly made coffee is now placed in the coffee container there is no chance of its being contaminated by previously deposited grounds, sediment or foreign material.

The condensing baffle in the cover is made of non-oxidizable metal, highly polished so that the coffee vapors will not deposit thereon.

The covers of coffee urns are usually made in one piece and since the cover is exposed to air it offers an excellent condensing surface, the water in the coffee liquid condensing, and the coffee is deposited in the form of a black looking material on the inside of the cover. This makes constant cleaning and frequent retinning of the cover necessary.

The baffle 15 is not in direct contact with the atmosphere, and is therefore highly heated which reduces the condensation. The vapor striking the baffle re-circulates, and if any black deposit takes place it is not as heavy as it would be if the baffle were not present.

The products of combustion from the burner travel upwardly along the exterior walls of the water chamber, which converges towards its upper end, so that the coffee is maintained in a uniformly heated condition.

The bypass from the drainage outlet to the coffee gauge is preferably provided with a controllable drainage outlet 27.

It will now be apparent that I have devised a new and useful coffee urn which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent is:

1. In a coffee urn, a coffee container having its bottom inclining downwardly from one side towards the opposite side, with a sump depressed beneath the plane of the bottom and inclining downwardly from near the central portion to the side wall of the container, a straight downwardly inclined drainage outlet leading from the lowest portion of said sump through the side wall of the container and the side wall of the urn, a valve controlling said drainage outlet, a dispensing outlet opening into the coffee container above the lowest portion of the sump, and a controlling valve for said dispensing outlet.

2. In a coffee urn, a coffee container having its bottom inclining downwardly from one side towards the opposite side, with a sump depressed beneath the plane of the bottom and inclining downwardly from near the central portion to the side wall of the container, a straight downwardly inclined drainage outlet leading from the lowest portion of said sump through the side wall of the container and the side wall of the urn, a valve controlling said drainage outlet, a dispensing outlet opening into the coffee container above the lowest portion of the sump, and a controlling valve for said dispensing outlet, said dispensing valve having a quick detachable connection with its outlet and said drainage valve having a removable valve plug whereby said outlets can be cleaned by insertion of a cleaning implement.

JAMES W. CUNNINGHAM.